United States Patent [19]

Suzuki

[11] Patent Number: 4,815,062

[45] Date of Patent: Mar. 21, 1989

[54] WRITE-ONCE DATA WRITING SYSTEM FOR OPTICAL RECORDING MEDIUM

[75] Inventor: Hidefumi Suzuki, Tokyo, Japan

[73] Assignee: CSK Corporation, Tokyo, Japan

[21] Appl. No.: 88,726

[22] Filed: Aug. 21, 1987

[30] Foreign Application Priority Data

Aug. 22, 1986 [JP] Japan .................................. 61-196797

[51] Int. Cl.⁴ ................................................ G11B 5/09
[52] U.S. Cl. ........................................................ 369/48
[58] Field of Search ............................. 369/32, 48, 44

[56] References Cited

U.S. PATENT DOCUMENTS

| | | | |
|---|---|---|---|
| 4,145,758 | 3/1979 | Drexler et al. | 365/200 |
| 4,269,917 | 5/1981 | Drexler et al. | 430/16 |
| 4,278,756 | 7/1981 | Bouldin et al. | 430/414 |
| 4,278,758 | 7/1981 | Drexler et al. | 430/616 |
| 4,360,728 | 11/1982 | Drexler | 235/462 |
| 4,375,091 | 2/1983 | Dakin et al. | 369/32 |
| 4,428,074 | 1/1984 | Abe et al. | 369/32 |
| 4,500,777 | 2/1985 | Drexler | 235/487 |
| 4,542,288 | 9/1985 | Drexler | 235/487 |
| 4,544,835 | 10/1985 | Drexler | 235/487 |
| 4,545,044 | 10/1985 | Satoh et al. | 369/32 |
| 4,562,562 | 12/1985 | Moriya et al. | 369/32 |
| 4,630,250 | 12/1986 | Nonomura | 369/32 |
| 4,691,154 | 9/1987 | Sato et al. | 318/685 |

Primary Examiner—William L. Sikes
Assistant Examiner—Frank González
Attorney, Agent, or Firm—Lowe, Price, Leblanc, Becker & Shur

[57] ABSTRACT

Disclosed is a write-once data writing method for optical recording medium of a type wherein a data track includes a plurality of sectors each having at least a preamble and data. A deceleration region is provided at a position following the last recorded sector on a track including both recorded and blank areas, the length of the deceleration region corresponding to a deceleration time necessary to change the relative moving rate of a writing/reading head with respect to the optical recording medium from one for reading to another for writing, and then additional data is recorded sector by sector at region following said deceleration region. Also, disclosed is an apparatus for achieving the method.

4 Claims, 2 Drawing Sheets

| | | | | |
|---|---|---|---|---|
| T1 | S1 (P,D) | S2 (P,D) | RW | S3 (P,D) |
| T2 | S1 (P,D) | | | |
| T3 | S1 (P,D) | S2 (P,D) | S3 (P,D) | S4 (P,D) |
| T4 | S1 (P,D) | S2 (P,D) | RW | S3 (P,D) |
| ⋮ | | | | |
| Tn-1 | S1 (P,D) | RW | S2 (P,D) | S3 (P,D) |
| Tn | S1 (P,D) | S2 (P,D) | S3 (P,D) | S4 (P,D) |

| | | | | |
|---|---|---|---|---|
| T1 | S1 (P,D) | S2 (P,D) | RW | S3 (P,D) |
| T2 | S1 (P,D) | | | |
| T3 | S1 (P,D) | S2 (P,D) | S3 (P,D) | S4 (P,D) |
| T4 | S1 (P,D) | S2 (P,D) | RW | S3 (P,D) |
| ⋮ | | | | |
| Tn-1 | S1 (P,D) | RW | S2 (P,D) | S3 (P,D) |
| Tn | S1 (P,D) | S2 (P,D) | S3 (P,D) | S4 (P,D) | ns
WRITE-ONCE DATA WRITING SYSTEM FOR OPTICAL RECORDING MEDIUM

BACKGROUND OF THE INVENTION

1. Field of the Invention

The present invention relates to a write-once data writing system for optical recording medium of a type wherein a data track includes a plurality of sectors each having at least a preamble and data.

2. Related Arts

In general, an optical recording medium has recording areas on which data is recorded as a pattern of changes in optical nature of the medium such as, reflectivity, transmissivity, polarization and the like. The patterns of changes are recorded by causing spots on the recording area to be physically or chemically transformed. Such changes are not reversible in most of optical recording media, which means that it is impossible to rewrite the data once written. However, there is a type of optical recording medium which allows additional data to be recorded only on areas not recorded yet. In recording data on such types of optical recording media, for example, a card type of optical recording medium, it is common to provide thereon information called "preamble" as sync regions operable in reading the recorded data.

The additional data recording may be performed a track-by-track or sector-by-sector manner.

In the former case wherein data is recordable on a track having no data recorded yet, the track is divided into a plurality of sectors each capable of storing a fixed or variable number of data with the preamble added at the beginning of each sector before recording data in the sector.

In the latter case wherein sectors of additional data are further recordable on the track which has several sectors of data previously recorded, the previously recorded sectors of data are read to detect the last recorded sector before recording additional data in the following sectors.

The track-by-track additional data recording system causes additional data to be recorded on a blank track separate from a recorded track even though the additional data is continued from the data on the recorded track. This results in a complex sequence of reading a series of data, increasing an access time.

Thus, this system does not satisfy the requirement that additional data is desirably recorded at an area following the area, on the same track, at which data is previously recorded.

Also, this system requires a number of blank tracks for recording additional data while leaving a lot of areas unused on a recorded track, degrading cost-performance and availability of recording area.

On the other hand, the sector-by-sector additional data recording system permits a series of data to be recorded continuously and in a sector-by-sector manner on the same track, which decreases unused area on each track, increasing availability of the recording area.

However, this system suffers from a serious disadvantage in its practical use by the following reasons:

In recording additional data on a track of the abovementioned type of optical recording medium, the previously recorded data on the track is first read out to find the end in a reading mode and then the additional data is written in a writing mode. Generally, the data writing is quite different from the data reading in their operation speed due to difference in their function. That is, it takes a certain time in the writing mode to cause a phisical or chemical transomation with a light beam like a laser beam directed at a position on the optical recording medium while in the reading mode the operation is done almost instantaneously to detect, using a light beam, the change in optical state due to the previously formed phisical or chemical transformation. Therefore, the moving rate of the light beam for data writing is different from that for data reading. This results in complex control not only in timing for switching the mode from reading to writing but in setting of start position for writing.

One approach to overcome the problem is to read at the same rate as that is the writing mode. This yields another disadvantage that it takes much time to access a position at which additional data writing is started.

The present invention has been made to obviate the problems as described above and it is an object of the present invention to provide a write-one data writing system for optical recording medium which enables us to write a series of data continuously on the same track.

It is another object of the present invention to provide a write-once data writing system for optical recording medium which utilizes recording area efficiently with less unused region on each track.

It is yet another object of the present invention to provide a write-once data writing system for optical recording medium which is simple in control of switching a mode from reading to writing as well as in control of setting a start position for writing.

It is further object of the present invention to provide a write-once data writing system for an optical recording medium which realizes a practical system for recording additional data in a sector-by-sector manner.

SUMMARY OF THE INVENTION

In accordance with the present invention, there is provided a write-once data writing method for optical recording medium of a type which allows a data track to include a plurality of sectors each storing at least data and a preamble having sync information, the method comprising the steps of: providing a deceleration region, at a position following the last recorded sector on a track including both recorded and blank areas, of a length corresponding to a deceleration time necessary to change the relative moving rate of a writing/reading head with respect to the optical recording medium from a reading rate to a writing rate; and writing additional data sector by sector at region following the deceleration region.

Further according to the present invention, there is provided an apparatus for embodying the foregoing method, the apparatus comprising: writing/reading head; a drive circuit for moving said head relative to an optical recording medium along the data track thereon at respective rates in writing and reading data; writing means for applying data to be written to said head and for controlling the writing operation; reading means for processing signals detected by said head to read control signals, data, etc.; mode switching means responsive to an instruction to record additional data, for first directing said drive circuit and said reading means to a reading mode and for then directing the same to a writing mode in response to a mode swicthing signal; and mode change judging means, responsive to said instruction, for checking through monitoring the output from said reading means if the preamble is, after detecting the the end of a sector, included in the next sector, and for generating said mode switching signal if no preamble is found.

The term "sector" is usually used in association with a disc type recording medium to represent a block of recording area on a track which is divided into a plurality of the blocks. In the present specification and the attached claims, the terms is also applied to a card type recording medium to stand for the similar conception. The sector may be of a fixed or variable length. In the case of the variable length, an end mark or pattern may be recorded at the end of each sector.

In a preferred embodiment, the end of the previously recorded sector on a data track, on which additional data is to be recorded, is detected through reading by the writing/reading head at a rate in a reading mode, and if no preamble is detected within a predetermined time after detecting the end of the sector, then the relative moving rate of the head is decelerated, while defining a deceleration region, to a writing rate to start the writing.

Also, said drive circuit preferrably has a function to decelerate the relative moving rate of the head in response to the mode switching signal until the rate reaches the writing rate, and then to apply a write enable signal to said writing means. Thus, said deceleration regeon is set having a length corresponding to the deceleration time necessary for the head to decelerate from the reading rate to the writing rate and a timing is set for biginning to write the additional data at a position following the deceleration region. The data is written sector by sector with the preamble added before the data in each sector in the same manner as the previously recorded sectors.

Operation

The prsent invention, employing a sector-by-sector data writing, enables us to write a series of data continuously on the same track with less unused area in each track, increasing the availability of the recording area.

Additionally, since the present invention provides a deceleration region, at a position following the last recorded sector on a track including both recorded and blank sectors, of a length corresponding to a deceleration time necessary to change mode from reading mode to writing mode, the relative moving rate of the head with respect to the recording medium can be decelerated from the reading rate to the writing rate during the time the head has passed the deceleration region.

PREFERRED EMBODIMENTS OF THE PRESENT INVENTION

Preferred forms of the system embodying the present invention wil now be described.

Figures 1, 2:
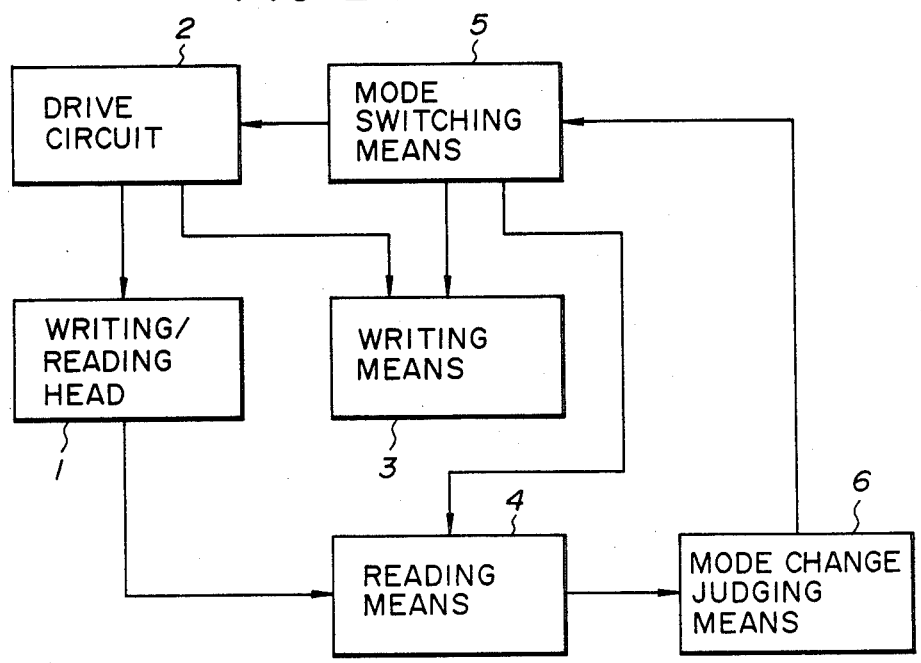
FIG. 1 shows a configuration of the optical recording medium embodying the method of the present invention.
FIG. 2 show a block diagram of the apparatus of the present invention.

FIG. 1 illustrates a configuration of the optical recording medium embodying a write-once data writing method according to the present invention.

In this case, the present invention is applied to a card type of optical recording medium. A plurality of tracks T1-Tn are disposed in parallel on a surface of the card type recording medium. On each track, data is written sector by sector like sectors S1,S2, . . . Each sector contains a preamble P and data D. The sector is of a fixed length in this embodiment.

The following procedures are taken to perform additional data recording on the optical recording medium having the foregoing format.

A selection is first made on which track additional data is recorded and an available area is detected on the track. The detection of the available area is done through reading, by the head, recorded information on the recorded sectors sequentially from the biginning of the track. Thus, previously recorded sectors S are detected along with its end portion. If no preamble is detected from the next sector, there is no more sectors previously recorded and the head reaches available area. Then, writing/reading control device (not shown) switches the mode of the read/write head from reading to writing.

The moving rate of the writing/reading head reaches a normal writing rate in a predetermined time after the head begain to decelerate. The deceleration region RW is set corresponding to the predetermined time. That is, the deceleration region is set as an elapsed time in an operation control program.

The deceleration region appears on the optical recording medium as a blank area with no data recorded. The length of this area is constant on condition that the reading and writing rates are fixed. Therefore, it is possible to achieve normal data writing if the writing is started a predetermind time after switching the mode.

In this case, timing and position for starting the writing are determined with reference to the time a predetermined period elapsed after the mode switching. Accordingly, the timing and position setting are set only by monitoring the elapsed time with a simple control.

Then, in retrieving data from the track containing the added data, the data is sequentially read from the beginning to the end in the same manner as described above. When the head has reached the deceleration region RW, it skips the region with no deceleration accompanied unlike the case in the additional data writing. The difference in operation can be achieved, for example, by software control.

Although the foregoing procedures for additional data recording may be performed with any apparatus, FIG. 2 shows a preffered one of such apparatuses.

The apparatus in FIG. 2 comprises writing/reading head 1, drive circuit 2 for moving the head relative to an optical recording medium along the data track thereon at respective rates in writing and reading data, writing means 3 for applying data to be recorded to the head 1 and for controlling the writing operation, and reading means 4 for processing signals detected by the head 1 to read control signals, data, etc. This configuration is similar to the known writing/reading apparatus.

The apparatus of this embodiment further comprises mode switching means 5 responsive to an instruction to record additional data, for first directing the drive circuit 2 and the reading means 4 to a reading mode and for then directing them to a writing mode in response to a mode switching signal, and mode change judging means 6, responsive to said instruction, for checking through monitoring the output from said reading means 4 if the preamble is, after detecting the end of a sector, included in the next sector, and for generating said mode switching signal if no preamble is detected. The mode switching means 5 and the mode change judging means 6 operate together as the above-mentioned writing/reading control device.

Figure 3:
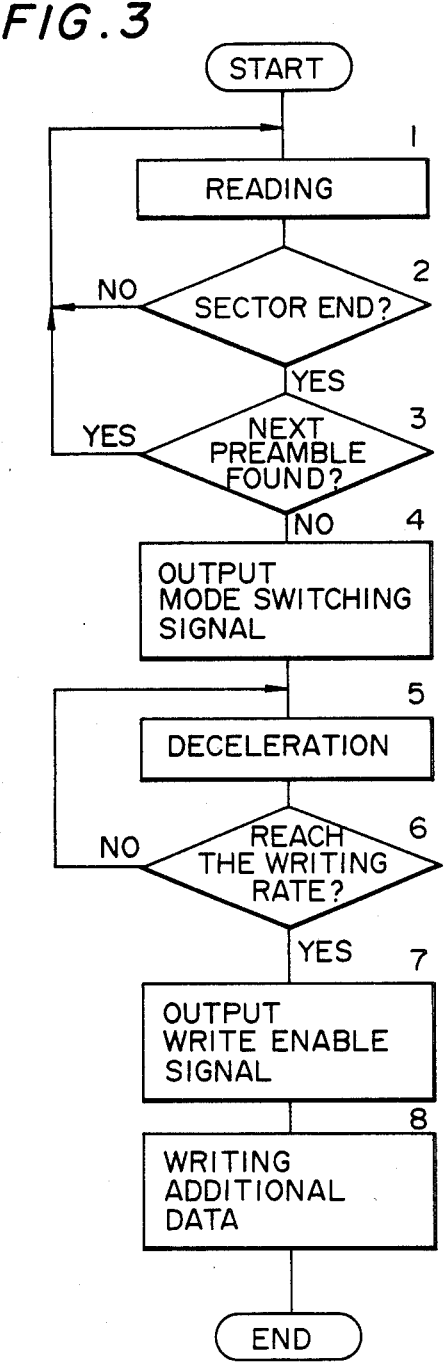
FIG. 3 is a flowchart of the operation of the present invention.

Referring now to FIG. 3 illustrating a flowchart, an operation of the apparatus in FIG. 2 is described below:

Drive circuit 2 causes the head 1 to move along a desired or target track at a reading rate while allowing reading means 4 to read the recorded information (step 1).

Reading means 4 sends the information to mode switching means 6 which detects, from the information, the end of each recorded sector and a preamble in the following sector. If no preamble is detected after detecting the last recorded sector, the mode switching means 6 outputs a mode switching signal (steps 2-4).

In response to the mode switching signal, mode switching means 5 causes drive circuit 2 to decelerate the moving rate of head 1 so that the moving rate is altered from the reading rate to the writing rate (step 5). The drive circuit 2 keeps checking if the moving rate has reached the desired writing rate, and then generates a write enable signal (steps 6 and 7).

Writing means 3 enables, in response to the write enable signal, head 1 to write additional data while causing the additinal data to be applied to the head 1 (step 8).

Thus, the additinal data recording procedures are completed.

In reading data on the track having additional data recorded, mode change judging means 6 keeps, after reading one sector, searching the succeeding preamble for a period longer than the deceleration time. If the succeeding preamble is found during the period, the data reading is continued. Thus, the deceleration region RW is skipped in the reading with no problem.

I claim:

1. A write-once data writing apparatus for optical recording medium of a type which allows a data track to contain a plurality of sectors each storing at least data and a preamble having sync information, the apparatus comprising:
    a writing/reading head;
    a drive circuit for moving said writing/reading head relative to an optical recording medium along the data track thereon at respective rates in writing and reading data;
    writing means for applying data to be recorded to said head and controlling the writing operation;
    reading means for processing signals detected by said head to retrieve control signals, data, etc.;
    mode switching means responsive to an instruction to record additional data, for first detecting said drive circuit and said reading means to reading mode and for then directing, when receiving a mode switching signal, the same to a writing mode; and
    mode change judging means responsive to said instruction, for checking through monitoring the output from said reading means if the preamble is, after detecting the end of a sector, included in the next sector, and for generating said mode switching signal if no preamble is found.

2. The write-once data writing apparatus according to claim 1 wherein said drive circuit, in response to the output from said mode switching means for switching the mode, causes the moving rate to decelerate until the rate reaches a writing rate, and then sends a write enable signal to said writing means.

3. A write-once data writing method for optical recording medium of a type which allows a data track to contain a plurality of sectors each storing at least data and a preamble having sync information, the method comprising the steps of:
    providing a deceleration region, at a position following the last recorded sector on a track including both recorded and blank areas, of a length corresponding to a deceleration time necessary to change the relative moving rate of a writing/reading head with respect to the optical recording medium from one for reading to another for writing; and
    writing additional data sector by sector at region following said deceleration region.

4. The write-once data writing method according to claim 3 wherein the recorded sector on a data track, on which additional data is to be recorded, is detected in a reading mode with said writing/reading head being moved at a reading rate, and wherein if no preamble is found within a predetermined period after detecting the end of the sector, the moving rate of the head is decelerated to a writing rate, while defining said deceleration region, followed by beginning to write the additional data.

* * * * *